Jan. 7, 1964   A. E. LAUDER   3,116,988
FUEL VAPORIZING ASSEMBLY
Filed Oct. 23, 1961   3 Sheets-Sheet 1
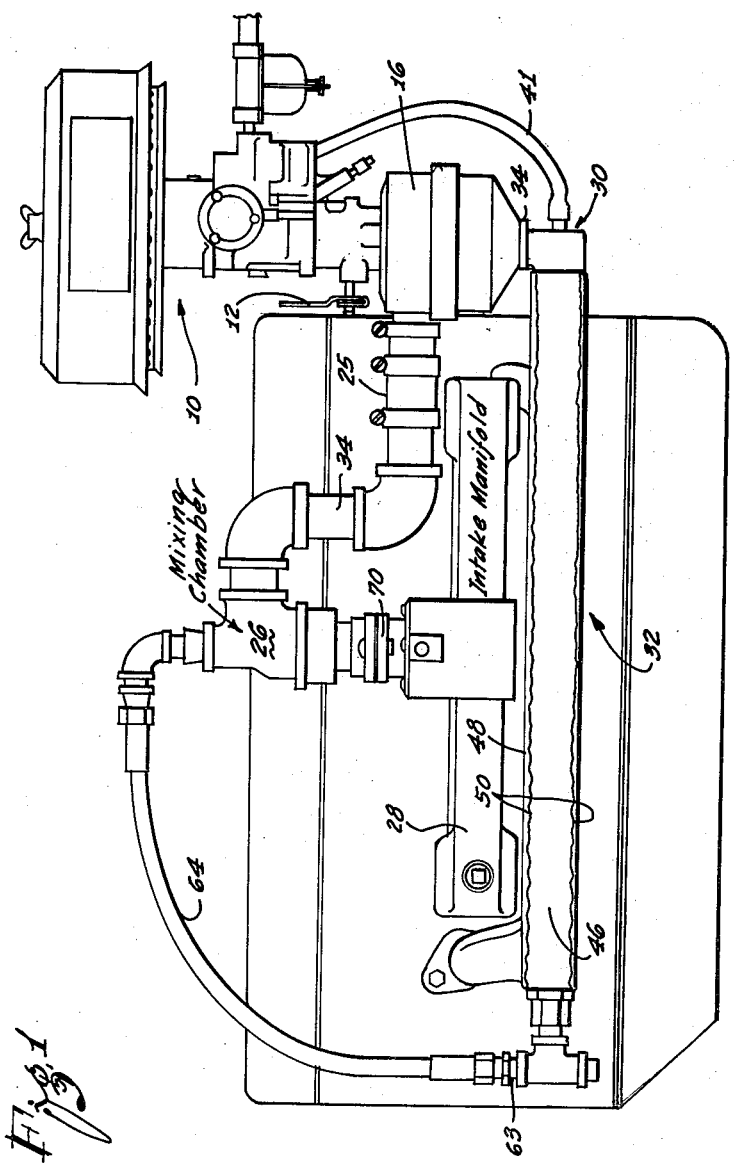
INVENTOR:
Alfred E. Lauder
By Keith D. Beecher
Attorney

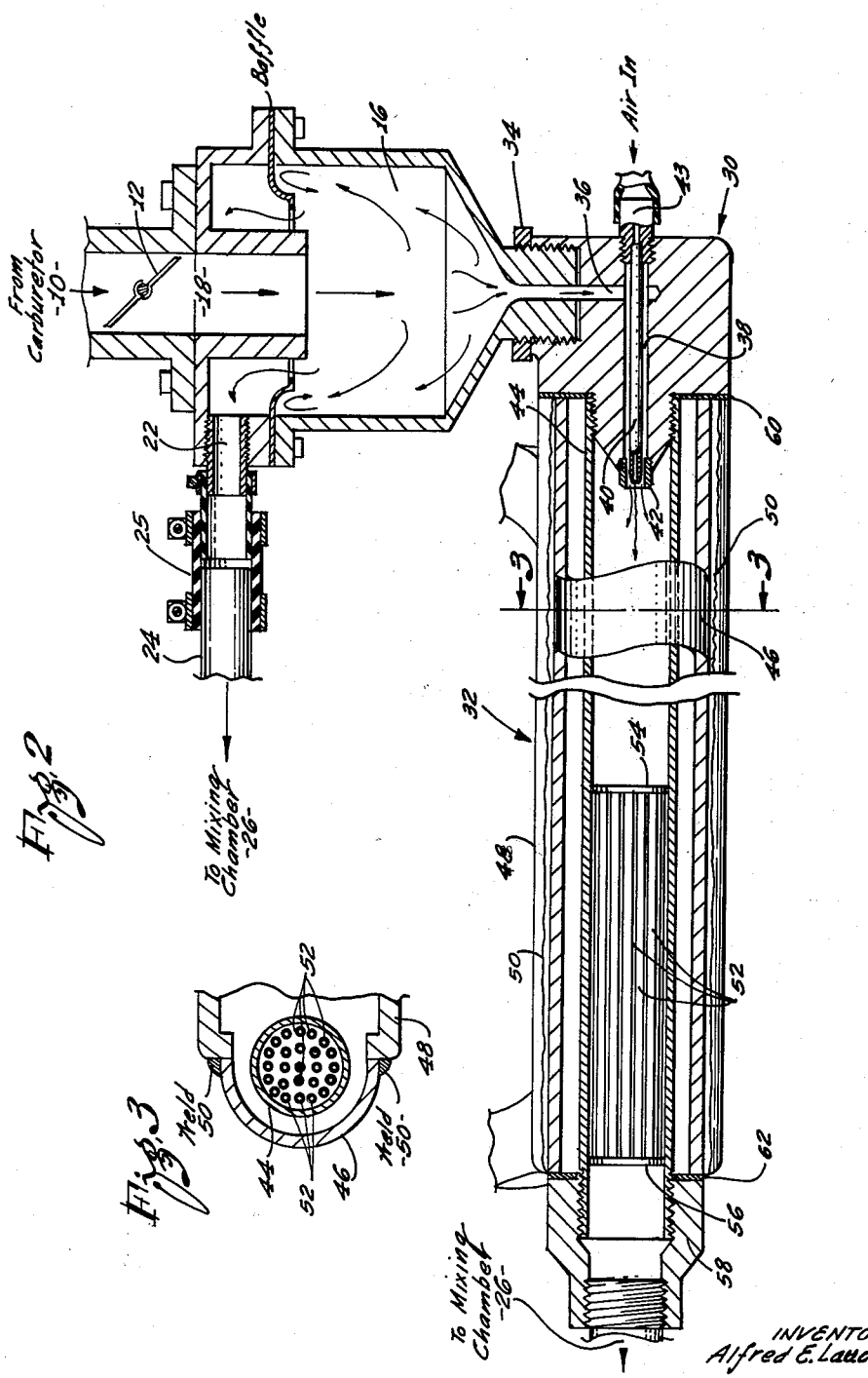

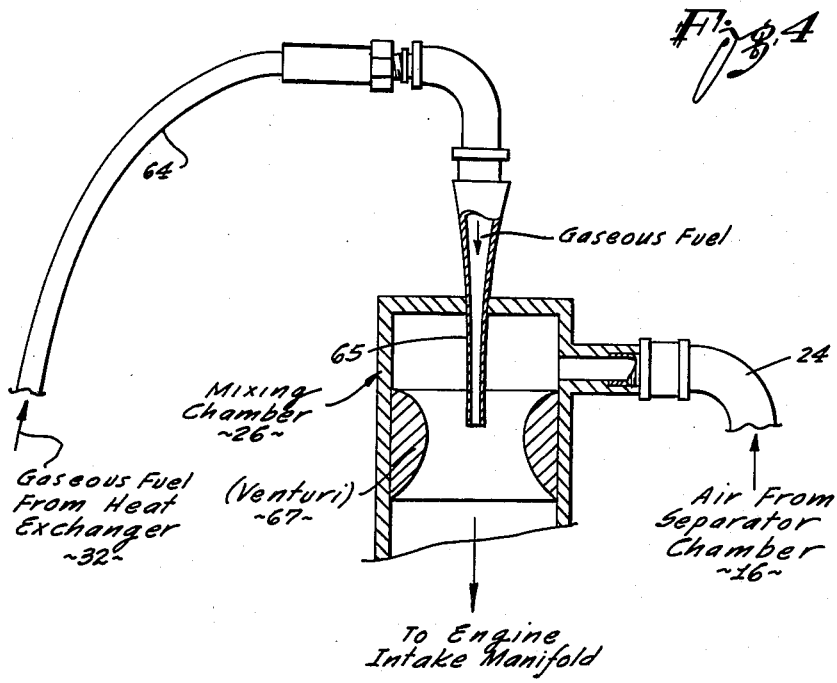

United States Patent Office 3,116,988
Patented Jan. 7, 1964

3,116,988
FUEL VAPORIZING ASSEMBLY
Alfred E. Lauder, Long Beach, Calif., assignor to Internal Combustion Research Company, Long Beach, Calif., a limited partnership
Filed Oct. 23, 1961, Ser. No. 147,708
4 Claims. (Cl. 55—222)

The present invention relates to a new and improved fuel vaporizing assembly; and it relates more particularly to an improved vaporizing assembly by which fuel is introduced to the intake manifold of an internal combustion engine in a pre-heated dry vapor and gaseous state, and by which the introduction of wet fuel to the internal combustion engine is completely obviated.

This application is a continuation-in-part of copending application Serial No. 121,668, filed July 3, 1961, in the name of Alfred E. Lauder, now abandoned; and of copending application Serial No. 73,624, filed December 5, 1960, in the name of Alfred E. Lauder, now abandoned.

It is well known that the creation of harmful sludges and varnishes in the cylinders and other parts of an internal combustion engine, as well as the creation of eye irritants in the atmosphere, are due to the introduction of wet fuel to the engine and to the resulting incomplete combustion of the fuel so introduced to the engine. This incomplete combustion is due to the fact that the portion of the fuel introduced to the prior art internal combustion engine in a wet liquid state is incapable of being burned completely. This not only creates the undesirable conditions referred to above, but also results in a material waste of fuel.

Systems are known to the art which include fuel vaporizing assemblies, and in which the heat of the exhaust gases of the internal combustion engine are used to pre-heat and vaporize the fuel introduced to the engine. This is accomplished in certain of the prior art assemblies by using the heat from the exhaust gases to raise the temperature of atomized fuel and a relatively small proportion of air from the carburetor, to a temperature range in which it can be assured that the fuel will be in its dry vapor phase. In this latter type of assembly, a fuel-rich mixture from the carburetor is so heated, and the major part of the air required for combustion by the internal combustion engine is fed directly to the intake manifold of the engine.

In the prior art assembly referred to immediately above, a small proportion of the total air to be introduced to the intake manifold of the internal combustion engine is mixed in the carburetor with the fuel to form a fuel-rich fuel/air mixture and the atomized fuel-rich mixture from the carburetor is passed through a heat exchanger. The fuel-rich mixture in the heat exchanger receives heat from the exhaust gases, and the temperature of the mixture is raised thereby to a desired high level. This level can be sufficiently high to produce complete vaporization of the fuel in the mixture, because of the limited amount of air present. In fact, these elevated temperatures can be controlled to any desired value, merely by controlling the proportion of air in the fuel-rich mixture from the carburetor.

As noted above, in the prior art assembly, the resulting high temperature attainable in the heat exchanger provides for the transformation of the fuel into a dry vapor phase. This means that the fuel introduced to the intake manifold of the internal combustion engine is in a completely dry vaporized and gaseous state. As also noted, the major air requirements for combustion in the internal combustion engine are met by the independent introduction of air into the intake manifold along a path which by-passes the heat exchanger.

The improved assembly of the present invention, like the above described prior art assembly, causes a fuel-rich mixture to be heated in a heating chamber; and the improved assembly of the invention further causes the major air for combustion in the internal combustion engine to be supplied to the engine along a path which by-passes the heating chamber. That is, the improved assembly of the present invention also provides for the heating of atomized fuel with a limited amount of air to achieve the desired vapor phase of the fuel, and of subsequently mixing the vaporized fuel with additional air for combustion in the engine.

In the prior art assemblies, however, the major portion of the air required by the engine is fed through an independent intake valve to the engine, and in some of the prior art assemblies, relatively complicated provisions are made for metering the amount of air so fed to the engine under different speed conditions.

One of the objects of the present invention is to provide an improved fuel vaporizing assembly for use with an internal combustion engine and which is conceived and constructed so that the air for combustion in the internal combustion engine is fed to the engine in a precisely metered relationship with the vaporized fuel, so as to preserve the proper fuel/air ratio at all operating speeds of the engine.

Another object of the invention is to provide such a system which utilizes standard and relatively easily accessible components, so as to be simple and inexpensive in its construction and to be capable of being sold at a relatively low price.

Another object of the invention is to provide such an improved fuel vaporizing assembly which may be easily installed in existing internal combustion engines, and which utilizes many of the components presently utilized in the engine.

A feature of the invention is the provision of an improved fuel vaporizing assembly in which a usual carburetor, and not one designed for this particular purpose, is caused in the usual manner to atomize the fuel and to provide a fuel/air mixture of the proper proportions for any desired engine speed, and which includes a separating chamber in which a major portion of the air in the mixture spumed into the separating chamber from the carburetor is separated from the atomized fuel, thus permitting the atomized fuel and a small percentage of air to be passed through a heating chamber to be independently heated so as to transform the fuel to its dry vapor state, and which also includes means for subsequently re-mixing the fuel with the metered amount of air from the carburetor which was previously separated in the separating chamber. The new mixture is then introduced to the intake manifold of the associated internal combustion engine.

In brief, therefore, the improved fuel vaporizing assembly of the present invention includes: a fuel atomizing and metering unit, such as any appropriate present-day carburetor, for providing a fuel/air mixture of the proper precisely metered proportions for all engine speeds; a usual throttle at the outlet of the carburetor to control the flow of the fuel/air mixture from the carburetor; a separator chamber which separates the fuel from the fuel/air mixture received from the carburetor; a heating chamber for receiving the fuel from the separator to convert the fuel into a dry vapor; and a mixer for re-mixing the air from the separator and the dry vaporized fuel from the heat exchanger prior to their introduction into the intake manifold of the internal combustion engine.

An important feature of the improved fuel vaporizing assembly of the invention is the provision of means, as will be described, for drawing the fuel through the heating chamber at all engine speeds, and for assuring that there will be no build-up of fuel in the heating chamber, or in any other part of the assembly.

A further feature of the invention is to provide such an improved fuel vaporizing assembly in which the transformation of wet fuel into the dry vapor state at all engine speeds is assured.

Yet another feature of the invention is the provision of such an improved fuel vaporizing assembly which is rugged in its construction, which requires a minimum of space, and which can be readily installed in existing motor vehicles.

Other features and advantages of the invention which are believed to be new are set forth in the claims. The invention itself, however, may be best understood by reference to the following description when taken in conjunction with the accompanying drawing, in which:

FIGURE 1 is a side view of one embodiment of the invention as installed on the exhaust manifold of the internal combustion engine in a motor vehicle;

FIGURE 2 is a side sectional view of a portion of one embodiment of the fuel vaporizing assembly of the invention;

FIGURE 3 is a sectional view taken on the line 3—3 of FIGURE 2; and

FIGURE 4 is a view, partly in section, of one of the components of the fuel vaporizing assembly of the illustrated embodiment.

With reference now to the drawings, it should first be noted that a present-day standard, usual carburetor 10, of any known make, may be used in the fuel vaporizing assembly of the invention. This carburetor is designed to receive fuel and air in usual manner to provide the desired precisely metered fuel/air mixture required by the engine at the different engine speeds, and to atomize the fuel. That is, the carburetor 10 is used in usual manner to perform its usual and known functions.

A conventional throttle valve 12 (FIGURE 2) is positioned at the outlet of the carburetor 10, and this throttle valve controls the amount of fuel/air mixture fed to the internal combustion engine so as to control the speed of the engine. The carburetor 10 is mounted directly over a separator chamber 16, and the carburetor is coupled to the separator chamber through a passageway 18.

The passageway 18 is in the form of a tubular pipeline extending down into the separator chamber 16 from the top of the chamber, as best shown in FIGURE 2. The separator chamber 16, as shown, has a generally cylindrical configuration, with a cup-like lower portion.

An annular baffle is positioned in the separator chamber 16, in the manner illustrated in FIGURE 2. The chamber 16 has an outlet port 22 adjacent its top, and a tubular pipeline 24 is coupled to the outlet port by flexible couplings 25. The pipeline 24 couples the outlet port 22 to a mixing chamber 26 (FIGURE 1). The details of the mixing chamber 26 are shown in FIGURE 4. The outlet of the mixing chamber is coupled to the intake manifold 28 of the internal combustion engine, as shown in FIGURE 1.

The lower end of the separator chamber 16 defines a second outlet port which is coupled to an atomizing unit 30. The atomizing unit 30, in turn, is coupled to a heating chamber in the form of a heat exchanger 32.

As best shown in FIGURE 2, the atomizing unit 30 has an L-shaped tubular configuration, and it is threadably attached to the lower end of the separator chamber 16 by a suitably threaded fluid-tight coupling 34. The atomizing unit 30 has a first internal passageway 36 which extends down from the outlet port of the separator chamber 16 into the atomizing unit. The atomizing unit also includes a second internal passageway 38 which extends at right angles to the passageway 36 to the outlet end of the atomizing unit. The passageway 38, as shown in FIGURE 2, intersects the passageway 36.

A nozzle tip 42 is threaded into the passageway 38 at the outlet end of the atomizing unit 30, as shown in FIGURE 2. A nozzle tube 40 is mounted in the atomizing unit 30 in coaxial relationship with the passageway 38, as shown. The right hand end of the tube 40 in FIGURE 2 may be open to the atmosphere, or it may obtain air by way of a tubular member 41 (FIGURE 1) through the air filter associated with the carburetor 10. The tubular member 41 is coupled to the right hand end of the tube 40 by means of an appropriate fitting 43. The left hand end of the tube 40 and the tip 42 form a nozzle at the outlet end of the atomizing unit 30.

The vacuum pressure in the intake manifold of the internal combustion engine creates a suction pressure at the outlet end of the atomizing unit 38. When the throttle 12 is closed, and the engine is idling, this suction pressure causes air to flow in through the tubular member 41 (FIGURE 1) and through the tube 40 in the atomizing unit 30. Therefore, any liquid fuel that may enter the atomizing unit 30 under these conditions is quickly drawn into a spray by the suction pressure and by the action of the air through the tube 40.

As the throttle 12 is opened, more fuel is supplied down into the atomizing unit 30, together with a limited amount of air. This fuel/air mixture passes through the passageway 38 and is drawn by the vacuum pressure of the intake manifold through the outlet end of the atomizing unit 30. The fuel, therefore, emerges as a spray at the nozzle tip 42.

The air passing in through the tubular member 41, and in through the separator chamber 16, acts in a differential manner, so that there is always sufficient air at the nozzle tip 42 to create a spray of the liquid fuel at that point, regardless of the position of the throttle 12.

The left hand end of the atomizing unit 30 in FIGURES 1 and 2 extends into a first end of the heat exchanger 32. The heat exchanger 32 includes an inner tubular member 44, and the outlet end of the atomizing unit 30 is coupled into the end of the tubular member 44. This coupling is achieved by threading the tubular member 44 onto the threaded end of the atomizing unit 30. The tubular member 44 is mounted in a semi-circular tubular member 46 in coaxial relationship therewith. The semi-circular tubular member 46 is welded, or otherwise mounted, on the exhaust manifold 48 of the associated internal combustion engine.

The open portion of the tubular member 46 faces an elongated opening in the exhaust manifold 48, which opening is enclosed by the tubular member 46, as best shown in FIGURE 3. The tubular member 46 is welded to the exhaust manifold, as shown by the weld seam 50. This enables the tubular member 44 supported within the semi-circular tubular member 46 to be disposed in intimate engagement with the hot exhaust gases passing through the manifold 48. The outer surface of the tubular member 44, and the inner surface of the tubular member 46, are radially spaced from one another to form an annular chamber for receiving the hot exhaust gases.

It will be evident that the resulting configuration of the heat exchanger assembly 32 is extremely compact, and the assembly adds virtually nothing to the over-all size of the exhaust manifold of the associated internal combustion engine.

A plurality of smaller tubes 52 are supported adjacent one another within the tubular member 44 by brackets 54 and 56. The right hand ends of the latter tubes are spaced, for example, a particular distance from the end of the tubular member 44 and, as shown in FIGURE 2, the smaller tubes 52 are shorter than the tubular member 44. This provides a space in the tubular member 44 between the nozzle formed at the outlet end of the atomizing unit 30 and the right hand ends of the tubes 52. This permits the sprayed fuel from the atomizer 30 to pass through the tubes 52 in intimate engagement with the walls of these tubes for complete vaporization of the fuel.

In a constructed embodiment of the invention, the side of the exhaust manifold of a usual internal combustion engine was cut to form a longitudinal slot therein, and a one and one-quarter inch pipe was formed into a semi-circular trough to form the tubular member 46. This trough was welded to the exhaust manifold by welds, such as the weld seams 50 in FIGURE 3. The tubular member 44 in the constructed embodiment had an outer diameter of one inch. The tubular member was supported within the trough 46 in a coaxial manner to provide clearance between the two members so as to permit the hot exhaust gases to circulate around the tubular member 44.

The small tubes 52 in the constructed embodiment had an outer diameter of 3/16 of an inch, and a plurality of the order of thirteen or fourteen of these tubes were supported in the tubular member 44. The tubes 52 in the constructed embodiment were spaced a distance of two inches from the nozzle at the outlet end of the atomizing unit 30. The above dimensions are set forth, of course, merely by way of an illustrative example, and they are not intended to limit the invention in any way.

The heat exchanger 32 uses the heat from the exhaust gases to raise the temperature of the atomized fuel passing through it from the atomizer 30. As mentioned above, when the throttle 12 is closed, air for atomizing the fuel is supplied through the tubular member 41 in the atomizing unit. Then, as the throttle is opened, this auxiliary air through the tubular member 41 drops off and air from the separator chamber 16 serves to provide the desired spray effect of the fuel at the outlet end of the atomizing unit.

The cooperative differential action of the air through the tubular member 41 and from the separator chamber 16 in conjunction with the suction pressure exerted by the intake manifold of the engine, assures that adequate fuel atomization will occur at the nozzle tip 42 for all engine speeds and at all positions of the throttle 12, so that at all times the fuel enters the heat exchanger 32 in the form of a fine spray.

The outlet of the heat exchanger 32 is coupled by a threaded joint 58 (FIGURE 2) and a fitting 63 (FIGURE 1) to a pipeline 64 which extends to the mixing chamber 26 of FIGURE 4. The pipeline 64 terminates in the mixing chamber in a nozzle 65, as shown in FIGURE 4.

The threaded joint 58 threadably engages the left hand end of the tubular member 44 in FIGURE 2, drawing that member into a firm assembled coaxial relationship with the tubular member 46. Gaskets 60 and 62 may be provided at the ends of the tubular members 44 and 46, as shown, to assure a fluid-tight assembly.

As mentioned above, the pipeline 24 is also coupled to the mixing chamber 26, and this latter pipeline introduces the air from the separator chamber 16 into a portion of the mixing chamber 26 surrounding the nozzle 65, as best shown in FIGURE 4. A venturi tube 67 is positioned in the mixing chamber 26 in coaxial relationship with the nozzle 65, and this venturi tube defines an annular passage through the mixing chamber 26 for air from the pipeline 24 and for the gaseous fuel from the nozzle 65. The diameter of the nozzle 65 may, for example, be three-eighths of an inch, and the minimum diameter of the venturi tube 67 may, for example, be of the order of one inch to one and one-half inches.

It is well known that a fast moving stream of fluid flowing, for example, through a restricted area, such as a venturi tube, will produce a high vacuum in a nozzle extending into the venturi tube.

For example, if a nozzle, coupled to a fuel line, is positioned to extend coaxially into a venturi tube; and if fluid, such as air, is passed through the venturi tube, the passage of the fluid will, by aspirating effect, create a suction pressure in the nozzle which will serve to draw fuel through the fuel line and into the air stream.

The principle outlined above is, per se, known to the art, and is used as a basis for many types of vacuum pumps.

The purpose of the venturi tube 67 in the mixing chamber 26 is to provide an aspirating effect on the gaseous fuel drawn through the line 64. The effect of the venturi tube 67 in its cooperation with the nozzle 65 is to create a greater suction in the heat exchanger 32 than exists in the separator chamber 16.

That is, the improved assembly of the present invention, due to the aspirator action in the mixing chamber 26, provides for more vacuum in the heat exchanger 32 from the vacuum pressure of the intake manifold of the associated internal combustion engine, than in the separator chamber 18. This creates the desirable condition of no fuel build-up in the separator 16 or in the heat exchanger 32. The resulting vacuum pressure differential renders it impossible for any liquid fuel to build up in the separator chamber 16, in the atomizing unit 30, or in the heat exchanger 32.

The dimensions of the venturi tube 67 in the mixing chamber 26 can be selected for any particular application to be such that the correct vacuum pressure differential relationship is achieved to provide that for no accumulation of fuel in any part of the fuel vaporizing assembly of the invention at any engine speed.

Therefore, under low speed and idling conditions, the above discussed vacuum pressure differential, in conjunction with the auxiliary air drawn in through the tube 41 in the atomizing unit 30, assures that all liquid fuel in the separator chamber 16 will be drawn into the heat exchanger 32 and passed through the mixing chamber 26 to the intake manifold of the engine in gaseous form. Then, as the throttle 12 is opened, the vacuum pressure differential, in conjunction with the air drawn in through the separator chamber 16, assures that all the liquid fuel will be drawn in spray form through the atomizing unit into the heat exchanger 32 to be passed as a dry vapor to the intake manifold of the engine.

It is the pressure differential created by the venturi in the mixing chamber 26 in conjunction with the auxiliary air inlet tube 41 which assures a circulation of fuel through the assembly of the invention at all engine speeds; and these elements acting in conjunction with the described construction of the heat exchanger 32 assure that the fuel will be fully and completely vaporized in the heat exchanger at all times.

The general operation of the assembly is as follows: after the fuel is metered and atomized by the carburetor 10, it enters the separator chamber 16. When the fuel/air mixture from the carburetor enters the passageway 18 to the separator 16, it is drawn in a spumed manner into the separator chamber at a relatively high velocity, and the spumed fuel/air mixture swirls around in the separator chamber creating centrifugal forces. These centrifugal forces cause the heavier fuel particles to be drawn to the walls of the separator chamber and to run down the walls to the outlet of the separator chamber and into the atomizing unit 30. The fuel with about 3%–5% of the air, for example, is directed to the atomizing unit 30 to be vaporized in the heat exchanger 32 at a high temperature, whereas the remaining 95%–97% of the air is bypassed at ambient temperature through the pipeline 24 to the mixing chamber 26. This major portion of the air swirls up around the baffle in the separator and out the port 22 into the pipeline 24.

The wet fuel from the separator chamber 16 and, for example, about 3% of the air, is drawn therefore, into the atomizing unit 30. A relatively high velocity is created at the nozzle tip 42 at the output of the atomizing unit 30, as explained above, and the wet fuel is sprayed into the tubes 52 in the heat exchanger in a fine mist. This causes the fuel to contact the sides of the tubes 52 in the heat exchanger 32 over a wide area to be completely vaporized and transformed to its dry vapor state.

As mentioned above, the heat exchanger 32 extracts the heat from the exhaust gases of the engine, and it uses this heat to elevate the temperature of the wet fuel received from the atomizing unit 30. The temperature of the wet fuel is elevated to a level such that the fuel is completely transformed to its dry gaseous state. As also noted, the temperature to which the fuel can be raised can be controlled by controlling the percentage of air passing into the heat exchanger 32 with the fuel.

The dry vapor fuel from the heat exchanger 32 is then passed through the pipeline 64 into the mixing chamber 26. The suction pressure at the engine intake manifold 28, to which the mixing chamber is coupled through a coupling 70, causes the vaporized fuel to be drawn from the nozzle 65 in the mixing chamber 26, and also causes the air from the separator chamber 16 to be drawn through the pipeline 24 and down through the venturi tube 67. The resulting aspirating effect of the air through the venturi 67 provides an increased suction effect on the fuel passing through the nozzle 65 from the heat exchanger 32. This, as mentioned above, creates a desired vacuum pressure differential which assures circulation of the fuel through the assembly of the invention, and prevents any build-up of fuel in any of the components thereof.

The invention provides, therefore, an improved fuel vaporizing assembly for use in conjunction with an internal combustion engine, so that the fuel introduced to the internal combustion engine will be in its dry vapor state at all engine speeds. This, as noted above, assures complete combustion of the fuel in the engine, and precludes the harmful and undesirable effects which result from the incomplete combustion of the fuel. The present invention is particularly advantageous in that it may be quickly installed in existing motor vehicles and occupies a minimum of space in such vehicles.

While a particular embodiment of the invention has been shown and described, modifications may be made, and it is intended in the claims to cover all such modifications as fall within the spirit and scope of the invention.

I claim:

1. In a fuel vaporizing assembly for use with an internal combustion engine having an intake manifold and exhaust manifold, and which assembly includes: fuel separating means for receiving a metered mixture of air and fuel and for separating at least a major portion of the air from the fuel, said separating means having a first outlet port to which the fuel is directed and having a second outlet port to which the air is directed, and mixing means having an outlet port coupled to the intake manifold of the internal combustion engine and having a first inlet port coupled to said second outlet port of said separating means for receiving the air therefrom and having a second inlet port, the combination of: an elongated tubular heat exchanger member mounted adjacent the exhaust manifold of the internal combustion engine to derive heat therefrom, an atomizing unit having an inlet coupled to said first outlet port of said separating means and having an outlet coupled to a first end of said tubular heat exchanger member, said atomizing unit including a nozzle means at the outlet thereof for causing the fuel from said separating means to be introduced as a spray into said tubular heat exchanger member, and said atomizing unit including tubular means for introducing air from a further air inlet of said atomizing unit to said nozzle means along a path independent of said separating means to assist in forming said fuel into a spray, means coupling the second end of said tubular heat exchanger member to said second inlet port of the mixing means for introducing vaporized fuel from said tubular member to said mixing means, and a plurality of additional tubular members mounted adjacent one another in said first mentioned tubular member in longitudinal relationship therewith and with one another to assist in the vaporization of the fuel passed through said first-named tubular member.

2. The combination defined in claim 1 and in which said atomizing unit includes an L-shaped passage therein extending from the inlet to the outlet thereof, and in which said tubular means extends along a portion of said passageway in coaxial relationship with said portion from the further air inlet of said atomizing unit towards the outlet thereof and the nozzle means positioned at said outlet port.

3. A fuel vaporizing assembly for use in conjunction with an internal combustion engine for supplying fuel to the intake manifold thereof under the action of the vacuum pressure of the intake manifold, said assembly including: a carburetor for producing a metered mixture of air and atomized fuel; a separator chamber coupled to the carburetor for receiving the metered mixture of air and atomized fuel from the carburetor and for separating the fuel from at least a major portion of the air in said mixture, said separator chamber having a first outlet port adjacent its upper end and having a second outlet port adjacent its lower end; heat exchanger means coupled to the second outlet port of said separator chamber for receiving fuel therefrom and for heating the same to a temperature within a range to vaporize the fuel; an atomizing unit disposed between said separator chamber and said heat exchanger, said atomizing unit having a first inlet coupled to said separator chamber, a second inlet, and further having an outlet coupled to said heat exchanger for introducing the fuel from said separator chamber as a spray into said heat exchanger, said atomizing unit including a spray nozzle at the outlet thereof and a passageway extending from the first inlet to the outlet, said atomizing unit further including a tubular member extending from said second inlet to said spray nozzle for introducing air to said spray nozzle along a path independent of said separator chamber; and a mixing chamber having a first inlet port coupled to the first outlet port of said separator chamber for receiving air from said separator chamber and having a second inlet port coupled to said heat exchanger means for receiving vaporized fuel from said heat exchanger and for remixing the received air and vaporized fuel, said mixing chamber having an outlet port adapted to be coupled to the intake manifold of the internal combustion engine and including aspirator means through which the air and vaporized fuel are drawn by the suction pressure of the intake manifold, said aspirator means creating an increased vacuum pressure on the fuel drawn from said heat exchanger as compared with the vacuum pressure exerted on the air from said separator chamber to assure the circulation of fuel through said heat exchanger means.

4. A fuel vaporizing assembly for use in conjunction with an internal combustion engine for supplying fuel to the intake manifold thereof under the action of the vapor pressure of the intake manifold, said assembly including: a carburetor for producing a metered mixture of air and atomized fuel, a separator chamber coupled to the carburetor for receiving the metered mixture of air and atomized fuel, a separator chamber coupled to the carburetor for receiving the metered mixture of air and atomized fuel from the carburetor and for separating the fuel from at least a major portion of the air in said mixture, said chamber having a first outlet port adjacent its upper end and having a second outlet port at its lower end; heat exchanger means for receiving fuel from the second outlet port of said separator chamber and for heating the same to a temperature within a range to vaporize the fuel, said heat exchanger means including an elongated tubular member to be mounted adjacent the exhaust manifold of the internal combustion engine, and a plurality of additional tubular members mounted in said elongated tubular member in longitudinal relationship therewith and with one another to assist in the vaporization of the fuel passed through said tubular heat exchanger member; a mixing chamber having a first inlet port coupled to the first outlet port of said separator chamber for receiving the air from said separator chamber and having a second inlet port coupled to said heat exchanger means for receiving the vaporized fuel from said heat exchanger and for remixing the received air and vaporized fuel, said mixing chamber having an outlet port adapted to be coupled to the intake manifold of the internal combustion engine and including aspirator means through which the air and vaporized fuel are drawn by the suction pressure of the intake manifold, said aspirator means creating an increased vacuum pressure on the fuel drawn from said heat exchanger as compared with the vacuum pressure exerted on the air drawn from said separator chamber to assure the circulation of fuel through said heat exchanger means; and an atomizing unit coupled to the second outlet port of said separator chamber and to one end of said heat exchanger means, said atomizing unit including a nozzle extending into said one end of said heat exchanger means, means for introducing air into said nozzle along a path independent of said separator chamber to cause the fuel from said second outlet port of said separator chamber to be introduced as a spray into the interior of said heat exchanger means, and means coupling the other end of said heat exchanger means to said second inlet port of said mixing chamber.

References Cited in the file of this patent

UNITED STATES PATENTS

| | | |
|---|---|---|
| 800,777 | Westmacott | Oct. 3, 1905 |
| 1,017,186 | Stewart | Feb. 13, 1912 |
| 1,036,812 | Edmonson | Aug. 27, 1912 |
| 1,214,784 | Hiatt | Feb. 6, 1917 |
| 1,600,007 | Mock | Sept. 14, 1926 |
| 1,955,242 | Lacassagne | Apr. 17, 1934 |
| 2,366,322 | Foster | Jan. 2, 1945 |
| 2,890,722 | Loebel et al. | June 16, 1959 |
| 2,953,306 | Dijkstra | Sept. 20, 1960 |

FOREIGN PATENTS

| | | |
|---|---|---|
| 468,497 | Great Britain | July 6, 1937 |